(12) United States Patent
Leung

(10) Patent No.: US 9,968,073 B1
(45) Date of Patent: May 15, 2018

(54) CARGO ANCHOR DEVICE

(71) Applicant: Launch Lab, Inc., Pasadena, CA (US)

(72) Inventor: Michael Leung, Pomona, CA (US)

(73) Assignee: Launchlab, Inc., Pasadena, CA (US)

( * ) Notice: Subject to any disclaimer, the term of this patent is extended or adjusted under 35 U.S.C. 154(b) by 402 days.

(21) Appl. No.: 14/811,001

(22) Filed: Jul. 28, 2015

(51) Int. Cl.
*B60P 7/08* (2006.01)
*A01K 27/00* (2006.01)
*B60R 11/00* (2006.01)
*B60P 7/10* (2006.01)

(52) U.S. Cl.
CPC ............. *A01K 27/002* (2013.01); *B60P 7/10* (2013.01); *B60R 11/00* (2013.01); *B60R 2011/0036* (2013.01); *B60R 2011/0059* (2013.01)

(58) Field of Classification Search
CPC .. B60P 7/10; B60R 27/002; B60R 2011/0036; B60R 2011/0059; A01K 27/002
USPC ..... 410/77, 96–98, 100, 102, 106, 110, 116, 410/155; 24/301, 302
See application file for complete search history.

(56) References Cited

U.S. PATENT DOCUMENTS 6,805,522 B2 * 10/2004 Condon ................ B60P 3/079
410/100
2010/0215455 A1 * 8/2010 Burris .................. B65D 63/10
410/100

* cited by examiner

*Primary Examiner* — Stephen Gordon
(74) *Attorney, Agent, or Firm* — David J. Wilson

(57) ABSTRACT

The present invention is a device and method for preventing cargo in the cargo area of a vehicle from shifting forward in an accident, the vehicle having a horizontally hinged rear door.

10 Claims, 10 Drawing Sheets

CARGO ANCHOR DEVICE

BACKGROUND OF THE INVENTION

Pets, especially large pets, are often transported in pet crates or similar devices in the rear cargo area of a motor vehicle, such as a hatchback, a station wagon or a utility vehicle (e.g., an SUV). However, the pet is not safe in the event of an accident because the pet crate is not secured to prevent it from shifting forward during a crash. The "hold down" brackets in the cargo areas of most vehicles are frequently not strong enough to hold a pet crate with an animal in it, especially a large animal. Thus, what is needed are devices and methods suitable to secure a pet crate containing an animal in the event of an accident, especially with regard to limiting forward motion of the pet crate.

SUMMARY OF THE INVENTION

The present invention relates to a device(s) and methods of use of the device(s) that is effective in securing a pet crate (or other cargo) in the cargo area of a motor vehicle. The device is a cargo anchoring device. In an embodiment, the device comprises a bar, the bar having a first end and a second end with a first pair of slots (or other openings) being proximal to the first end of the bar and a second pair of slots (or other openings) being proximal to the second end of the bar. The bar of the device of the present invention is made of inflexible or essentially inflexible material such as fiber board, metal, steel, stainless steel, aluminum, plastic (e.g., hard plastic), hard rubber, and composites thereof, as are known to one of ordinary skill in the art. Further, the bar may be padded or coated with a soft material such as rubber, fabric or soft plastic to help prevent scratching of the vehicle. In other embodiments, the bar may be made from a non-hard, semi-soft or soft material because the vehicle door will provide resiliency to the bar.

The device further comprises rigging, a first rigging being passed through the first pair of slots (or other shaped openings) and a second rigging passing through the second pair of slots or other shaped openings in the bar. Thus, other shaped openings may include holes, ovals, zig-zags (to help keep the rigging from slipping), or other suitable opening depending on the type and shape of rigging used. Further, the rigging may pass around the bar, the rigging being positioned, for example, in grooves or indentations located at the edge of the bar. The grooves or indentations help keep the rigging from slipping off the bar. Rigging may be made from, for example, webbed strap, unwebbed strap, bands, belts, rope, cable, plastic strap, chains, steel strapping and aluminum strapping, etc., or combinations, thereof, as are known to one of ordinary skill in the art. For example, the portion of the rigging that passes under the door from the outside to inside the vehicle may be made of webbed strap and the portion that extends from the inside the vehicle door to the cargo attachment means may be made of chain. Each rigging has an end proximal to the bar and an end distal to the bar. The proximal ends of the rigging pass through the slots (or other opening) on the bar. The ends of the rigging distal to the bar comprise a device for attachment to, for example, a pet crate or other form of cargo. The means for attachment to a pet crate or other form of cargo may be, for example, hooks, b-rings, rings, a mounting plate, swivel hooks, S-hooks, clips and ties, etc., as are known to one of ordinary skill in the art. Each rigging may also comprises a means for adjusting the length of the rigging. Such means are known in the art and include buckles, slide adjusters, etc.

The cargo anchor device of the present invention is not limited by size and may be any size suitable for use in a motor vehicle having a door hinged at the top edge of the door. A motor vehicle is defined as a motorized passenger or commercial vehicle suitable for use on public roads.

The present invention also relates to methods of securing a pet crate or other cargo in a motor vehicle, the motor vehicle having a horizontally hinged door, preferably the door is hinged at the top of the door but, in the case of pickup trucks, for example, may be hinged on the bottom. The present invention can also be used to secure an animal wearing a harness, as is exemplified in the illustration in FIG. 9.

The method comprises, for example, providing, i) the device of the present invention, ii) cargo, and iii) a vehicle with a horizontally hinged door; attaching the rigging to the cargo; placing the bar outside of the vehicle at approximately at the side opposite the hinged side of the horizontally hinged door if the door is hinged at the top, or between the vehicle and the door, if the door is hinged at the bottom; closing the horizontally hinged door such that the bar is outside the horizontally hinged door, the rigging passes between the horizontally hinged door and the vehicle body to the inside of the vehicle; and the rigging is attached to said cargo and the length of the first and second rigging is adjusted such that the first and second rigging are of even length and taut. In another embodiment, the rigging is attached to the cargo and the length is adjusted prior to placing it outside of the vehicle and closing the door.

The present invention is also related to a kit comprising the device of the present invention and instructions for use.

In an embodiment, the present invention contemplates a device for securing cargo in a vehicle body having a door horizontally hinged at the top edge, said device comprising: a bar comprised of a non-flexible or an essentially non-flexible material, said bar having a first end and a second end and a longitudinal axis and a vertical axis, the first end having a first rigging treaded through the bar and the second end having a second rigging threaded through the bar, said first and said second rigging having a lateral axis, such that when the bar is secured and tension is placed on the rigging, the longitudinal axis and vertical axis of the bar are caused to be orientated essentially perpendicular to the lateral axes of the first and the second rigging; wherein, both the first rigging and the second rigging comprises a means for securing the cargo.

In a further embodiment, the first and said second rigging are equivalent. In still a further embodiment, the first rigging and said second rigging comprise webbed straps. In a further embodiment, the cargo is selected from the group consisting of a pet crate, a pet box, a crate, a box, a satchel, a duffel, a bag, a pallet, a harnessed animal and a platform. In a further embodiment, the cargo is a device suitable for containing an animal. In a further embodiment, the bar is comprised of essentially non-flexible material is selected from a group consisting of fiber board, metal, steel, stainless steel, aluminum, plastic, hard rubber, and composites thereof. Ina further embodiment, the means for securing the cargo are selected from the group consisting of hooks, D-rings, rings, a mounting plate, swivel hooks, S-hooks, clips and ties. In a further embodiment, the rigging is selected from a group consisting of webbed strap, unwebbed (or non-webbed) strap, bands, belts, rope, cable, plastic strap, chains, steel strapping and aluminum strapping. In a further embodiment, the first rigging comprises a length adjustment mechanism and the second rigging comprises a length adjustment mechanism. In a further embodiment, the first rigging is threaded through the bar through two parallel slots and said second rigging is threaded through the bar through two parallel slots.

In an embodiment, the present invention contemplates a method of securing cargo in a vehicle having a door horizontally hinged at the top edge, the method comprising (in no particular order): providing, i) a device for securing cargo in a vehicle, the device comprising: a bar comprised of a non-flexible or an essentially non-flexible material, said bar having a first end and a second end and a longitudinal axis and a vertical axis, the first end having a first rigging treaded through the bar and the second end having a second rigging threaded through the bar, said first and said second rigging having a lateral axis, such that when tension is placed on the rigging, the longitudinal axis and the vertical axis of the bar are caused to be orientated essentially perpendicular to the lateral axes of the first and the second rigging, and each rigging comprising a means for securing the cargo, ii) cargo, and iii) a vehicle with a horizontally hinged door; placing the bar outside of the vehicle at approximately at the side opposite the hinged side of the horizontally hinged door; closing the horizontally hinged door such that the bar is outside the horizontally hinged door, the rigging passes between the horizontally hinged door and the vehicle body to the inside of the vehicle; attaching said rigging to said cargo; and adjusting the length of the first and second rigging such that the first and second rigging are taut.

In a further embodiment, the second rigging are equivalent. In a further embodiment, the rigging comprises webbed straps. In a further embodiment, the cargo is selected from the group consisting of a pet crate, a pet box, a crate, a box, a satchel, a duffel (i.e., a duffel bag), a bag, a pallet, a harnessed animal and a platform. In a further embodiment, the cargo is a device suitable for containing an animal. In a further embodiment, the essentially non-flexible material is selected from a group consisting of steel, stainless steel, aluminum and plastic. In a further embodiment, the means for securing the cargo are selected from the group consisting of hooks, D-rings, rings, a mounting plate, swivel hooks, S-hooks, clips and ties. In a further embodiment, the rigging is selected from a group consisting of webbed strap, unwebbed strap, bands, belts, rope, cable, plastic strap, chains, steel and aluminum. In a further embodiment, the first rigging comprises a length adjustment mechanism and the second rigging comprises a length adjustment mechanism. In further embodiment, the first rigging is threaded through the bar through two parallel slots and said second rigging is threaded through the bar through two parallel slots.

DETAILED DESCRIPTION OF THE INVENTION

The invention will now be described in detail with reference to a few preferred embodiments, as illustrated in accompanying drawings. In the following description, numerous specific details are set forth in order to provide a thorough understanding of the invention. However, it will be apparent to one skilled in the art that the invention may be practiced without some or all of these specific details. In other instances, well-known features and/or process steps have not been described in detail in order to not unnecessarily obscure the invention. The features and advantages of the invention may be better understood with reference to the drawings and discussions that follow.

While the invention has been described with respect to a limited number of embodiments, those skilled in the art, having benefit of this disclosure, will appreciate that other embodiments can be devised which do not depart from the scope of the invention as disclosed herein.

In the present application, a range of value, e.g., less than 50%, between 25% and 50%, etc., refers to all values within the rage given. For example, if the range of between 10% and 25% is given, then the values of 10.2%, 15% and 19.9% are considered described in the specification and understood to be included in the specification by one of ordinary skill in the art. Likewise, if a series of values is given, e.g., about 10%, about 20%, about 30%, etc., then all values between the recited values are considered described in the specification and understood to be included in the specification by one of ordinary skill in the art. For example, in the series presented in the previous sentence, the values of about 12% and of about 26.5% are included and described.

Any US Patents and US Patent publications cited herein are incorporated by reference. All references cited herein, regardless of source, exemplify what is known to one of ordinary skill in the art to which this application pertains.

In the present invention all terms will mean both the singular and plural unless clearly defined to be one or the other. Likewise, direct (the) and indirect (a, an) objects will be considered interchangeable in the present specification excluding the claims.

The term "equivalent" shall be defined as two items being "functionally equivalent" or as two or more items being able to perform the same function even though they may not look identical.

The term "perpendicular" shall be defined as being at right angles. The term "essentially perpendicular" shall be defined as being within about 5° (degrees) or about 10° of perpendicular.

Figure 1:
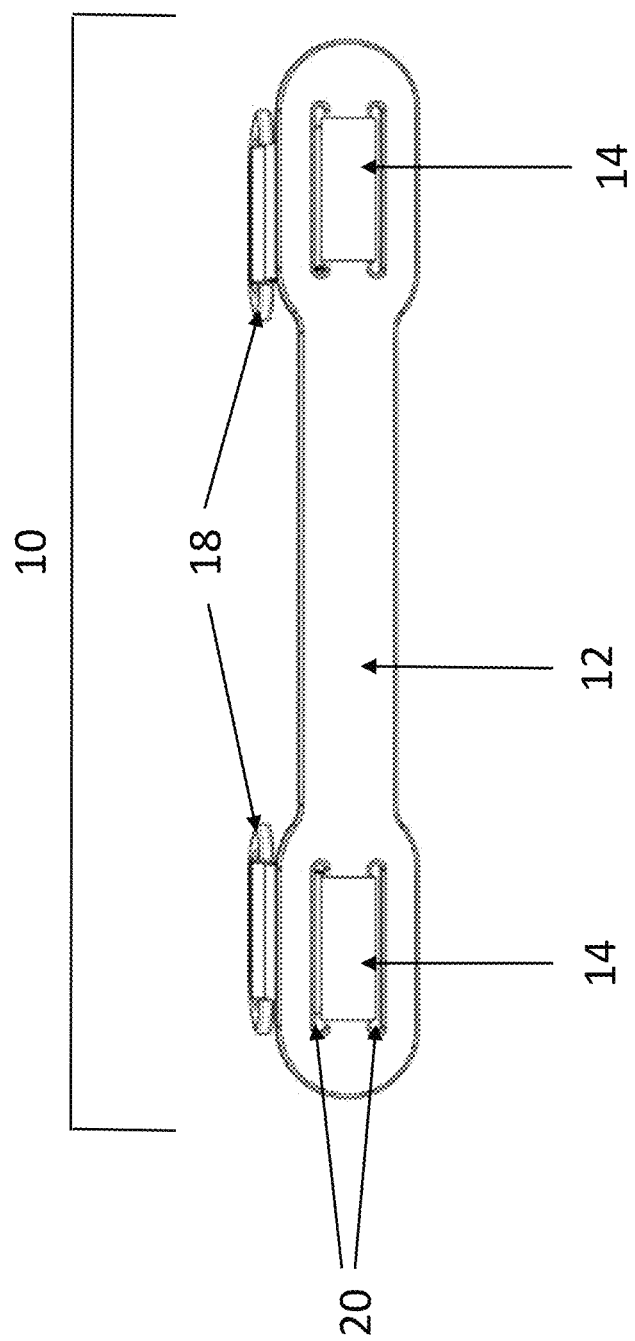
FIG. 1 shows a view of the bar of the anchor device of the present invention, i.e., a front view of the device.

FIG. 1 shows the cargo anchor device 10 of the present invention with the bar 12, the straps 14, one of the two securing rings 18, and the two pairs of slots on the bar 20 (the right pair is slots is not numbered).

Figure 2:
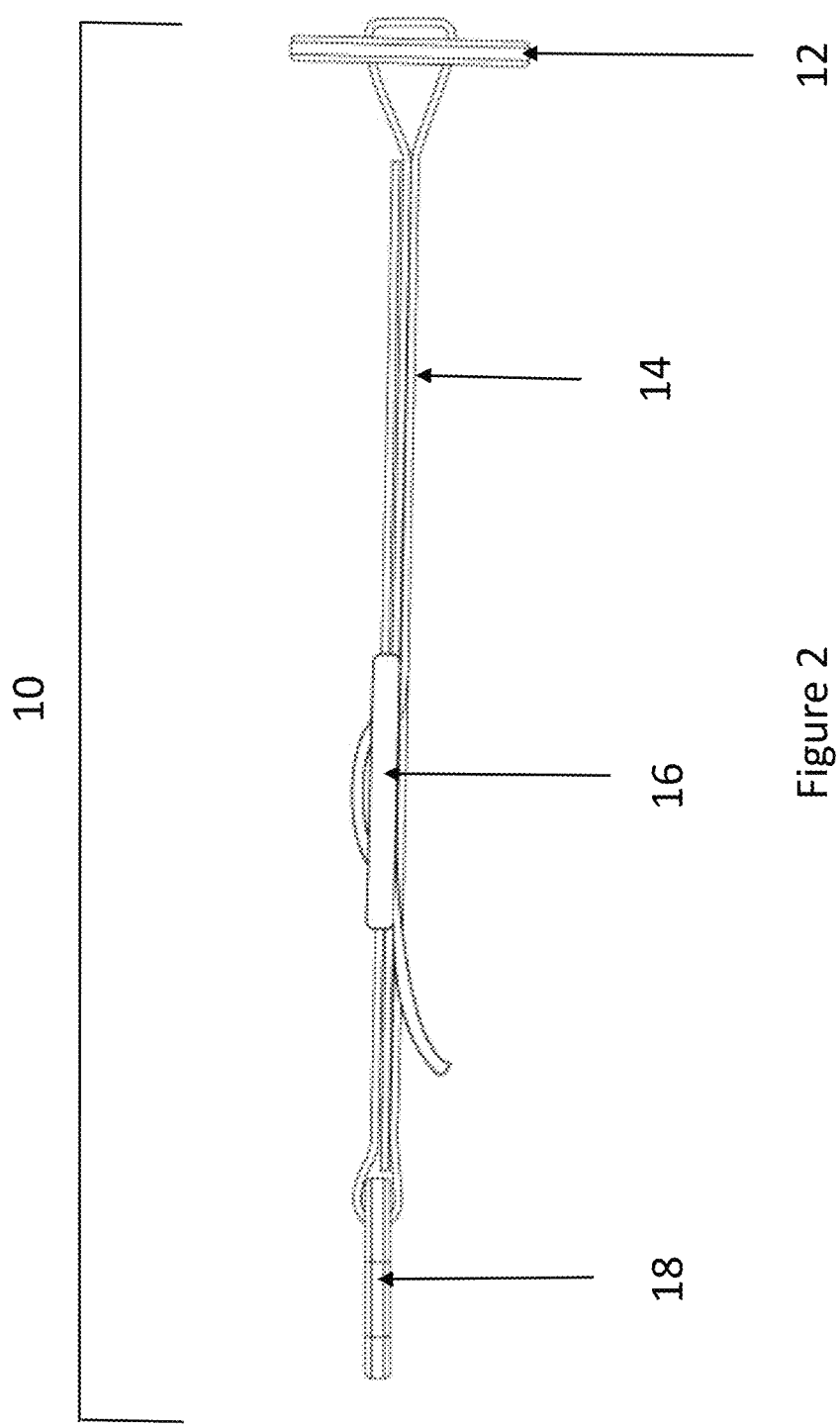
FIG. 2 shows a side view of the anchor device of the present invention.

FIG. 2 shows a side view of the cargo anchor device 10 of the present invention with the bar 12, the straps 14, the strap adjustment sliders 16, and one of the two securing rings 18.

Figure 3:
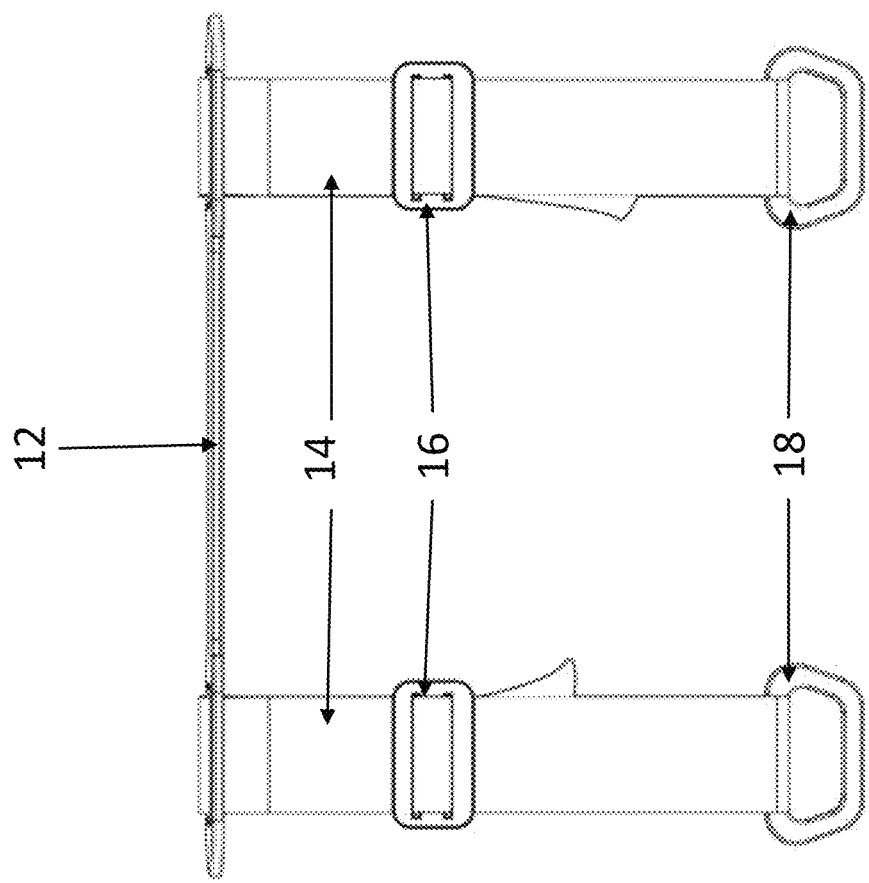
FIG. 3 shows a top view of the anchor device of the present invention.

FIG. 3 shows a top view of the cargo anchor device 10 of the present invention with the bar 12, the straps 14, the strap adjustment sliders 16, and the two securing rings 18.

Figure 4:
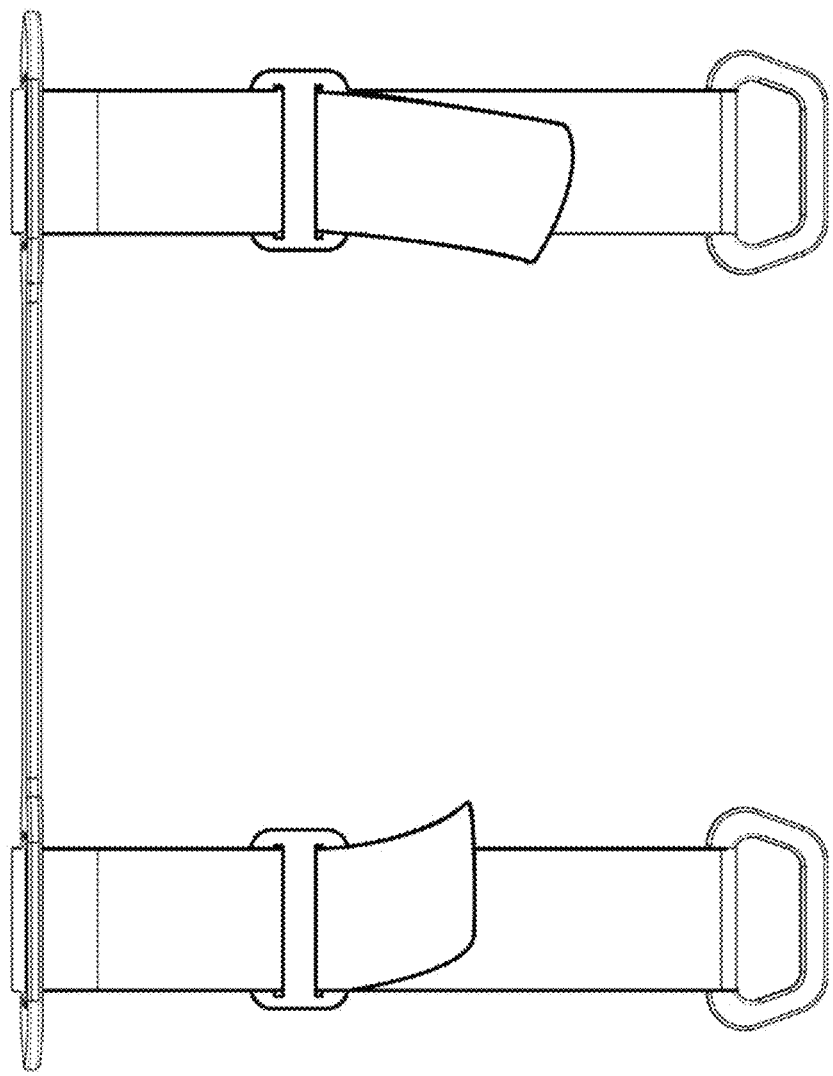
FIG. 4 shows a bottom view of the device of the present invention. Numbering of device parts is the same as in FIGS. 1-3.

FIG. 4 shows a bottom view of the cargo anchor device of the present invention. The numbering of the various elements of the device is the same as in FIGS. 1-3.

Figure 5:
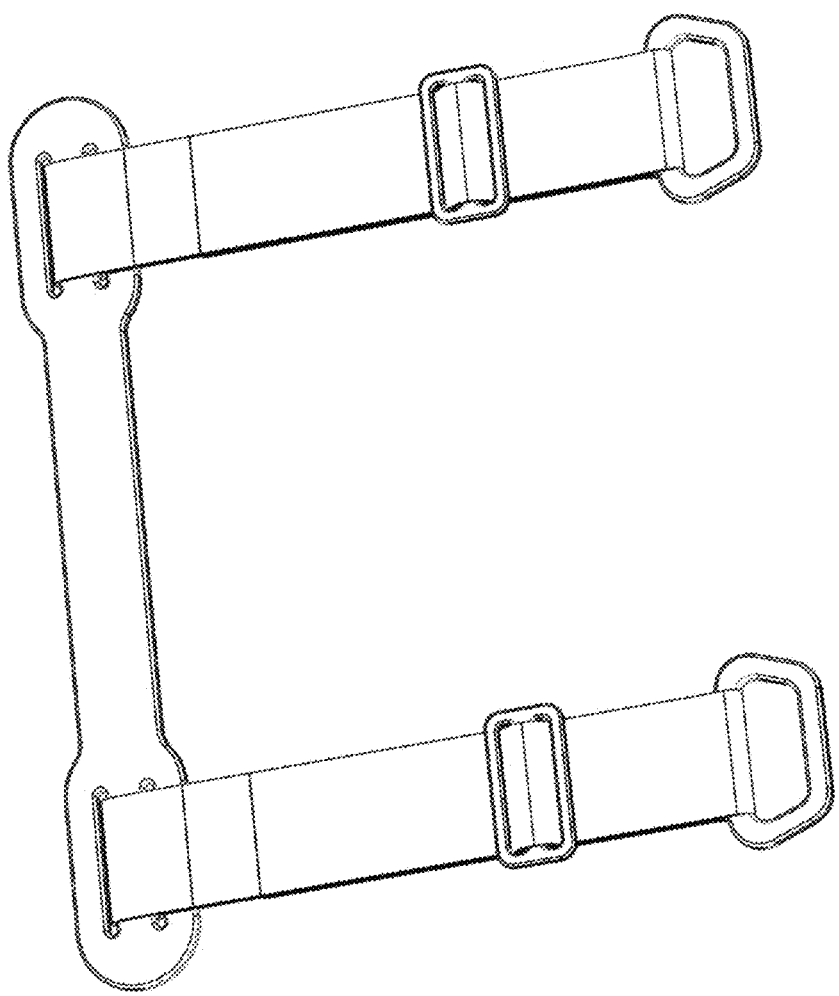
FIG. 5 shows a perspective view of the device of the present invention. Numbering of device parts is the same as in FIGS. 1-3.

FIG. 5 shows a perspective view of the cargo anchor device of the present invention. The numbering of the various elements of the device is the same as in FIGS. 1-3.

Figure 6:
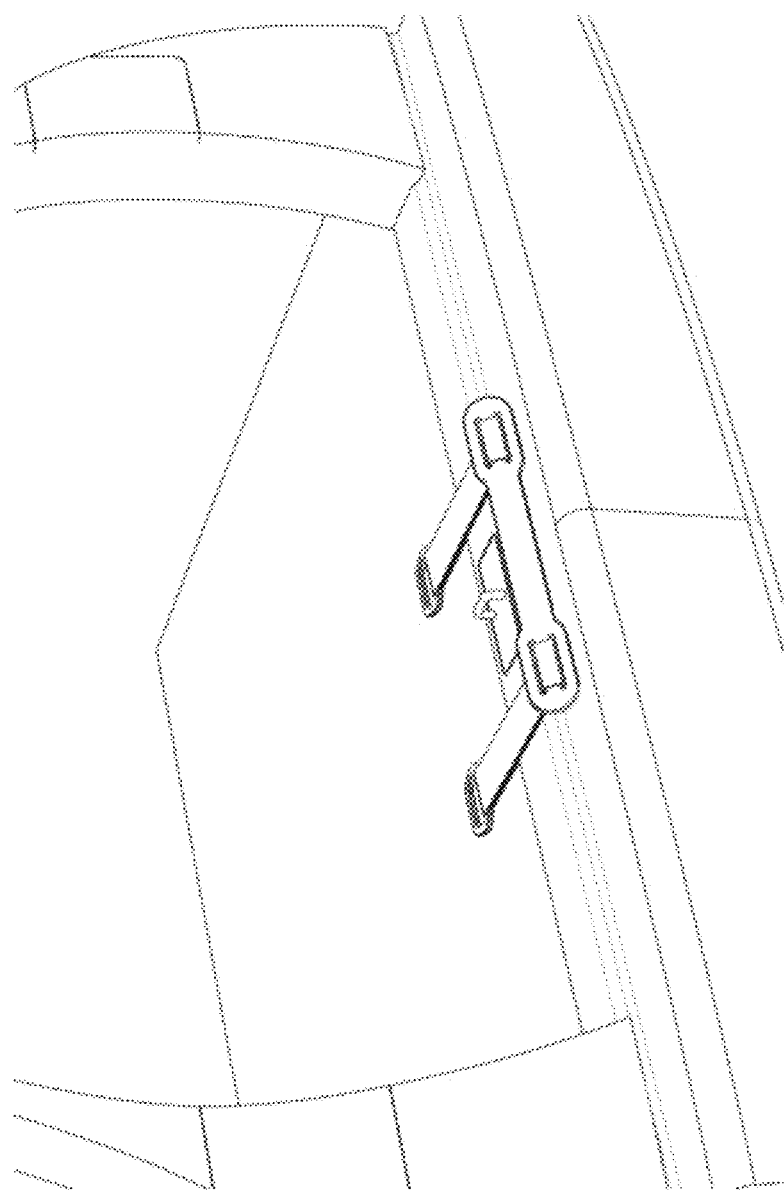
FIG. 6 shows the device of the present invention located outside of a vehicle with a horizontally hinged door with the door opened. In this view D-rings are attached and visible on the rigging.

FIG. 6 shows the cargo anchoring device of the present invention in place on a motor vehicle prior to attachment to cargo and prior to having the horizontally hinged door closed. The cargo anchoring device in this view has rings to secure the cargo.

Figure 7:
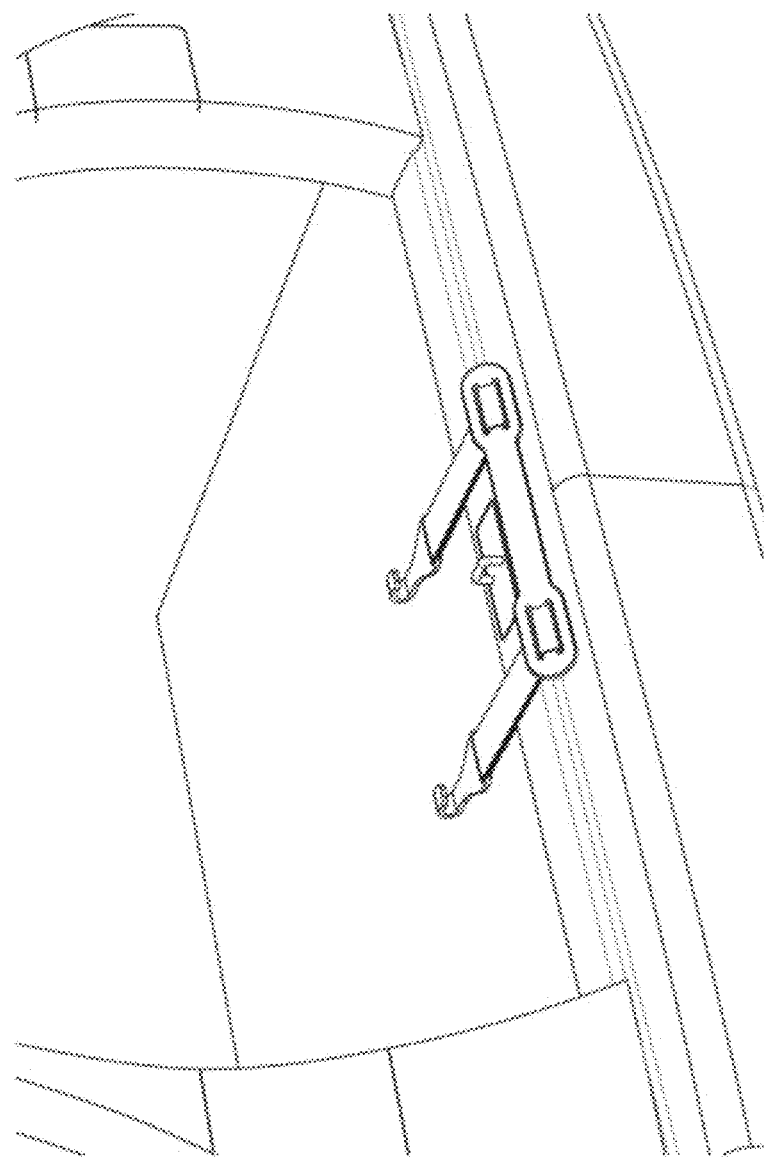
FIG. 7 shows the device of the present invention located outside of a vehicle with a horizontally hinged door with the door opened. In this view hooks are attached and visible on the rigging.

FIG. 7 shows the same view as FIG. 6 but with hooks for securing the cargo instead of rings.

Figure 8:
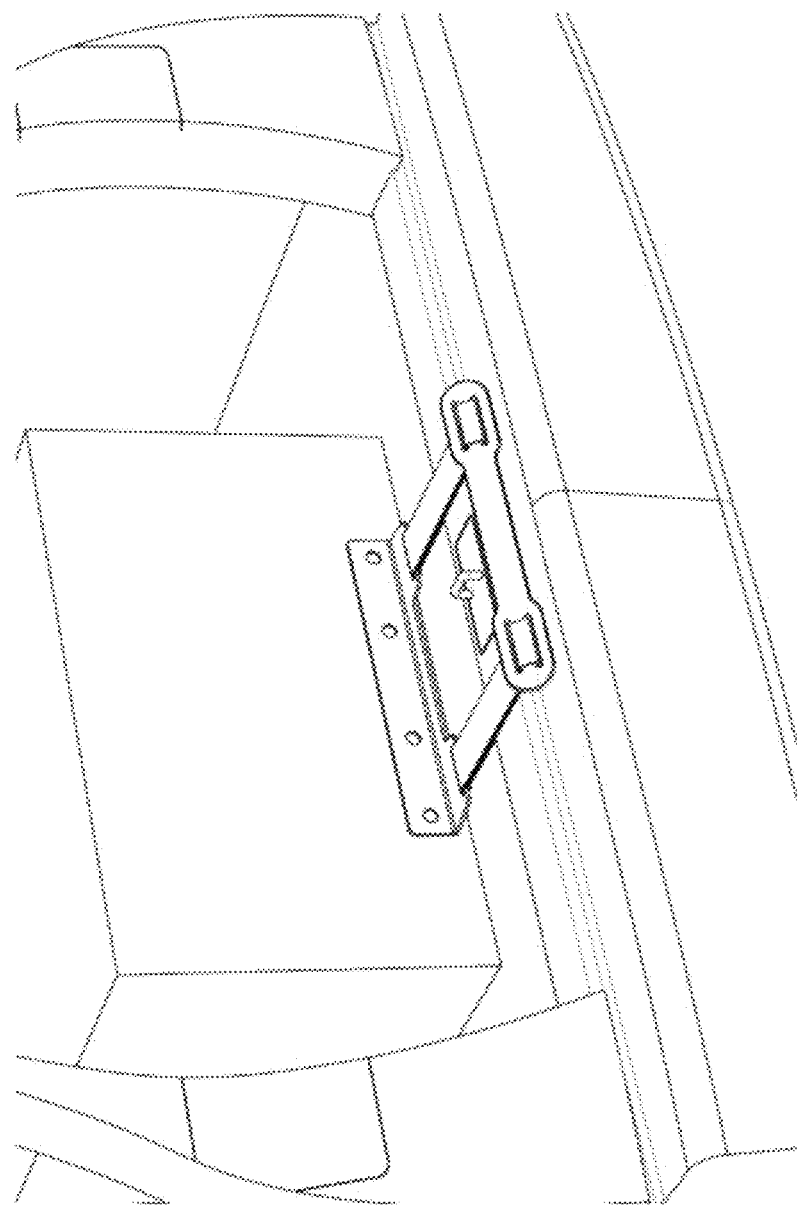
FIG. 8 shows the device of the present invention located outside of a vehicle with a horizontally hinged door with the door opened. In this view an attachment bar is attached and visible on the rigging and secured to the cargo.

FIG. 8 shows the same view as FIG. 6 but with an attachment bar for securing the cargo instead of rings.

Figure 9:
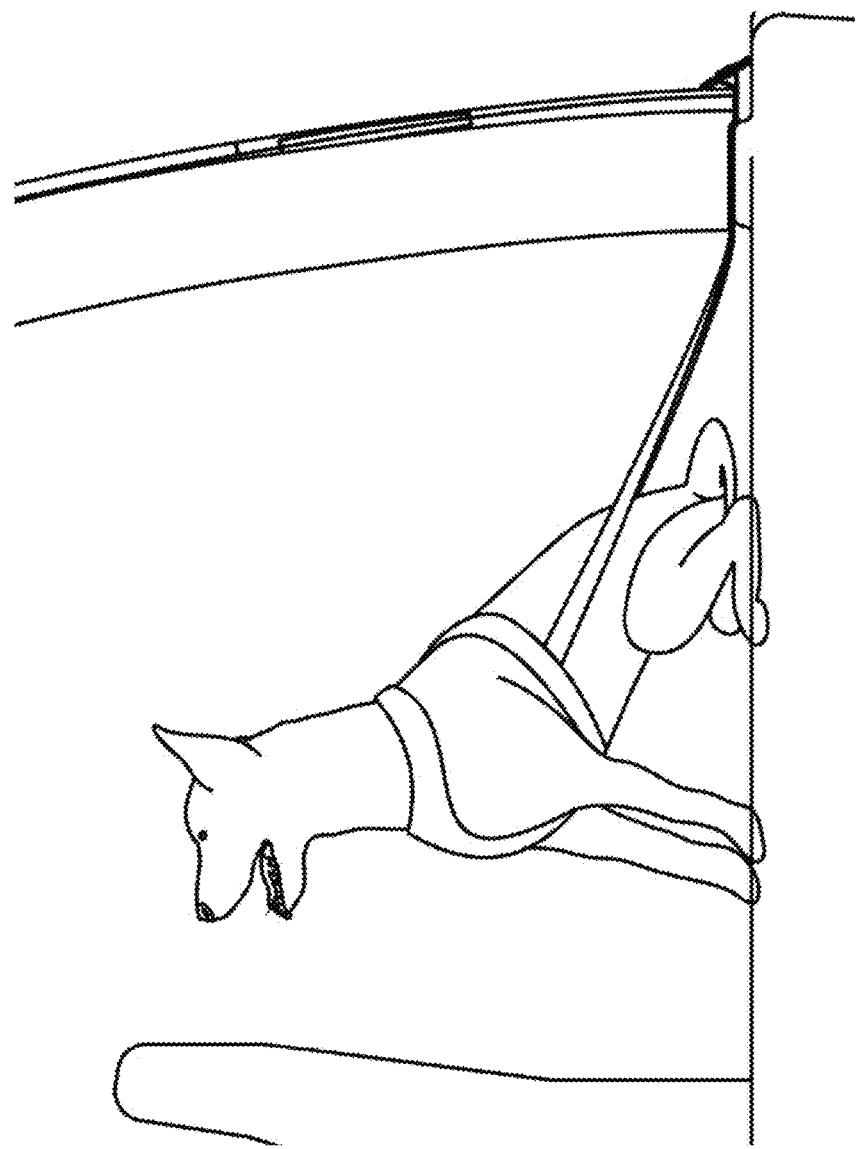
FIG. 9 shows the device of the present invention attached to a harness on an animal.

FIG. 9 shows a side view of the cargo anchor device of the present invention being used to secure an animal wearing a harness.

Figure 10:
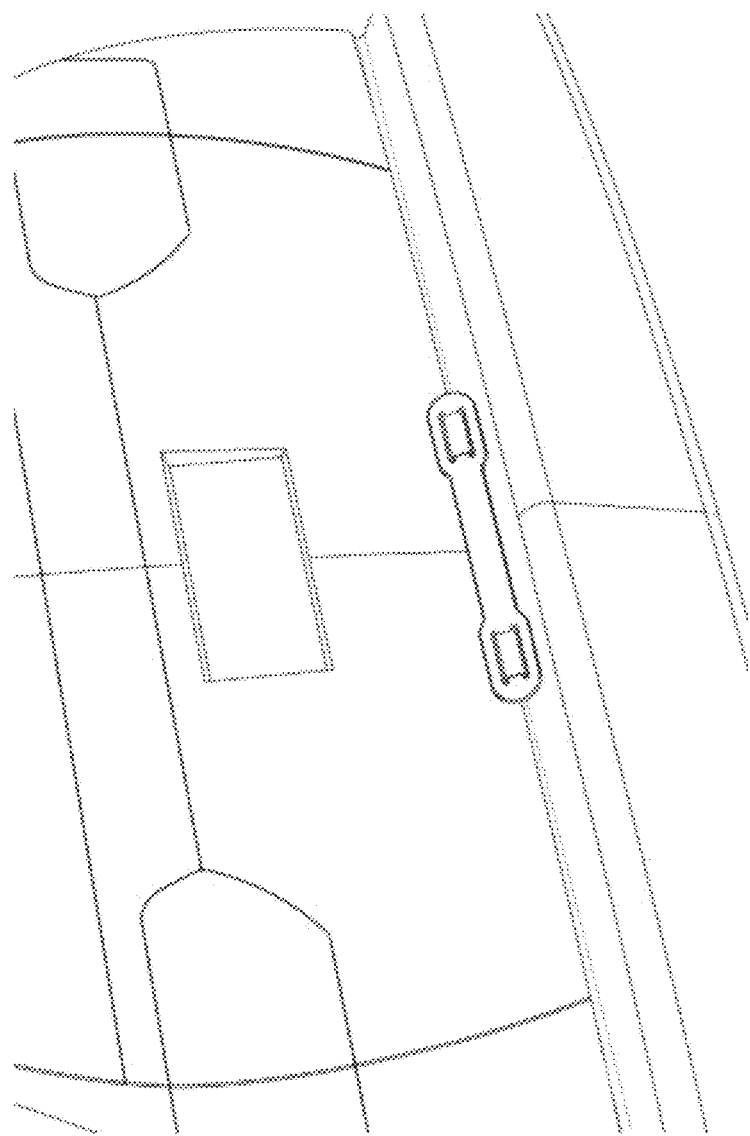
FIG. 10 shows the device of the present invention located outside of a vehicle with a horizontally hinged door with the door closed.

FIG. 10 shows the cargo anchoring device of the present invention positioned on a motor vehicle with the horizontally hinged door closed.

I claim:

1. A method of securing cargo in a vehicle having a door horizontally hinged at the top edge, the method comprising:
   providing, i) a device for securing cargo in a vehicle, the device comprising: a bar comprised of a non-flexible or an essentially non-flexible material, said bar having a first end and a second end and a longitudinal axis and a vertical axis, the first end having a first rigging treaded through the bar and the second end having a second rigging threaded through the bar, said first and said second rigging having a lateral axis, such that when tension is placed on each rigging, the longitudinal axis and the vertical axis of the bar are caused to be orientated essentially perpendicular to the lateral axes of the first and the second rigging, and each rigging comprising a means for securing the cargo, ii) cargo, and iii) a vehicle with a horizontally hinged door;
   placing the bar outside of the vehicle at approximately at a side opposite a hinged side of the horizontally hinged door;
   closing the horizontally hinged door such that the bar is outside the horizontally hinged door, each rigging passes between the horizontally hinged door and the vehicle body to the inside of the vehicle;
   attaching each said rigging to said cargo; and
   adjusting a length of the first and second rigging such that the first and second rigging are taut.

2. The method of claim 1, wherein, said first and said second rigging are equivalent.

3. The method of claim 1, wherein said rigging comprises webbed straps.

4. The method of claim 1, wherein said cargo is selected from the group consisting of a pet crate, a pet box, a crate, a box, a satchel, a duffel, a bag, a pallet, a harnessed animal and a platform.

5. The method of claim 1, wherein said cargo is a device suitable for containing an animal.

6. The method of claim 1, wherein said essentially non-flexible material is selected from a group consisting of steel, stainless steel, aluminum and plastic.

7. The method of claim 1, wherein said means for securing the cargo are selected from the group consisting of hooks, D-rings, rings, a mounting plate, swivel hooks, S-hooks, clips and ties.

8. The method of claim 1, wherein said rigging is selected from a group consisting of webbed strap, unwebbed strap, bands, belts, rope, cable, plastic strap, chains, steel and aluminum.

9. The method of claim 1, wherein the first rigging comprises a length adjustment mechanism and the second rigging comprises a length adjustment mechanism.

10. The method of claim 1, wherein said first rigging is threaded through the bar through two parallel slots and said second rigging is threaded through the bar through two parallel slots.

* * * * *